(12) United States Patent
Takamatsu et al.

(10) Patent No.: US 7,720,583 B2
(45) Date of Patent: May 18, 2010

(54) VEHICLE CONTROL APPARATUS AND METHOD OF SUPPRESSING VIBRATION OF VEHICLE

(75) Inventors: Hideki Takamatsu, Anjo (JP); Shoji Inagaki, Numazu (JP); Yasuhiro Nakai, Anjo (JP); Kenji Kawahara, Kariya (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 236 days.

(21) Appl. No.: 11/910,618

(22) PCT Filed: Jun. 7, 2006

(86) PCT No.: PCT/IB2006/001491

§ 371 (c)(1),
(2), (4) Date: Oct. 4, 2007

(87) PCT Pub. No.: WO2006/134438

PCT Pub. Date: Dec. 21, 2006

(65) Prior Publication Data

US 2008/0172155 A1   Jul. 17, 2008

(30) Foreign Application Priority Data

Jun. 14, 2005   (JP)   ............................. 2005-173484

(51) Int. Cl.
    B60G 23/00   (2006.01)
(52) U.S. Cl. ...................................................... 701/40
(58) Field of Classification Search ............... 701/40
    See application file for complete search history.

(56) References Cited

U.S. PATENT DOCUMENTS

| 5,097,419 | A * | 3/1992 | Lizell .......................... 701/37 |
| 5,231,583 | A * | 7/1993 | Lizell .......................... 701/37 |
| 7,352,869 | B2 * | 4/2008 | Inoue et al. ............. 381/71.11 |
| 2004/0153227 | A1 * | 8/2004 | Hagiwara et al. ............. 701/40 |
| 2004/0247137 | A1 * | 12/2004 | Inoue et al. ................ 381/71.4 |
| 2005/0027402 | A1 * | 2/2005 | Koibuchi et al. ............... 701/1 |

(Continued)

FOREIGN PATENT DOCUMENTS

DE    103 53 692    6/2004

(Continued)

*Primary Examiner*—Jack W. Keith
*Assistant Examiner*—Rami Khatib
(74) *Attorney, Agent, or Firm*—Oblon, Spivak, McClelland, Maier & Neustadt, L.L.P.

(57) ABSTRACT

A powertrain control ECU sets a target driving force, and controls an internal combustion engine and a transmission of a vehicle. A first processor of the powertrain control ECU includes a driving force adjustment portion, a filter, a mode-switch, an environmental information-obtaining device, and a steering sensor. The driving force adjustment portion sets the target driving force based on at least one of instructions from a driver and from a second processor. The filter corrects the target driving force to suppress vibration on a spring of the vehicle. The mode-switch sets the running mode. The environmental information-obtaining device obtains information on the environment around the vehicle. The steering angle sensor determines the running condition. A correction amount, by which the filter corrects the target driving force, is adjusted according to the running mode, the environment, and the running condition.

7 Claims, 8 Drawing Sheets

U.S. PATENT DOCUMENTS

2005/0049761 A1 * 3/2005 Kataoka et al. .............. 701/1

FOREIGN PATENT DOCUMENTS

| | | |
|---|---|---|
| EP | 0 388 107 | 9/1990 |
| EP | 0 591 754 | 4/1994 |
| JP | 2-189216 | 7/1990 |
| JP | 3-78542 | 4/1991 |
| JP | 3 114931 | 5/1991 |
| JP | 11-349236 | 12/1999 |

* cited by examiner

VEHICLE CONTROL APPARATUS AND METHOD OF SUPPRESSING VIBRATION OF VEHICLE

CROSS-REFERENCE TO RELATED APPLICATIONS

The present application claims priority to Japanese Patent Application No. 205-173484 filed on Jun. 14, 2005, the entire contents of which are hereby incorporated herein by reference.

BACKGROUND OF THE INVENTION

1. Field of the Invention

The invention relates to a vehicle control apparatus that mainly controls a powertrain device of a vehicle, and a method of suppressing vibration of a vehicle, which reduces vibration on a spring of a vehicle.

2. Description of the Related Art

Japanese Patent Application Publication No. JP-A-2004-168148 describes a vehicle control apparatus for suppressing vibration of a vehicle. The vehicle control apparatus uses, as an instruction, a physical quantity corresponding to at least one of accelerator pedal operation, steering operation, and brake operation performed by a driver, and controls at least one of an engine and a brake according to the instruction. To suppress vehicle vibration, the vehicle control apparatus uses a movement model relating to vibration to correct the instruction input by the driver. That is, at least one of vertical vibration and/or torsional vibration caused by road surface reaction, which is applied to tires, vibration under a spring of a suspension, and vibration on the spring of the suspension, which is applied to a vehicle body itself.

However, in a conventional vehicle control apparatus, only a single movement model is used to correct the instruction input by the driver. Therefore, in a vehicle where the running characteristic can be changed according to the intention of the driver or the like, a conventional vehicle control apparatus may not be able to adequately suppress the vehicle vibration. Also, in the case where the instruction input by the driver is corrected using the single movement model as described above, the vehicle vibration may not be effectively suppressed if the environment around the vehicle or the running condition of the vehicle changes.

SUMMARY OF THE INVENTION

In view of the above, the invention provides a vehicle control apparatus and a method of suppressing vibration of a vehicle, which effectively suppresses vehicle vibration even if the driver or the like changes the running characteristic of the vehicle, or even if the driving environment around the vehicle or the running condition of the vehicle changes.

An aspect of the invention relates to a vehicle control apparatus that sets a target control amount related to running movement of a vehicle, and controls at least a powertrain device of the vehicle based on the target control amount. The vehicle control apparatus includes a controller. The controller sets the target control amount based on at least one of an instruction from a driver and an instruction from a predetermined control device provided in the vehicle. The controller determines at least one of the running characteristic of the vehicle set by the driver, the environment around the vehicle, and the running condition of the vehicle. The controller corrects the target control amount to suppress vibration on a spring of the vehicle. A correction amount, by which the target control amount is corrected, is adjusted according to the at least one of the running characteristic, the environment around the vehicle, and the determined running condition.

The controller may include a running characteristic determination device that determines the running characteristic of the vehicle set by the driver. The correction amount may be adjusted according to the determined running characteristic.

The controller includes the running characteristic determination device. The controller sets the target control amount based on the instruction provided by the driver using operation device such as an accelerator pedal, a brake pedal, and a steering wheel, and/or the instruction from the control device such as a cruise-controller. The running characteristic determination device determines the running characteristic of the vehicle that is set by the driver or the like, such as the mode where priority is given to acceleration, and the mode where priority is given to comfort. Further, the controller corrects the target control amount to suppress the vibration on the spring of the vehicle. When the controller corrects the target control amount, the correction amount, by which the target control amount is corrected, is adjusted according to the running characteristic. Thus, in the vehicle control apparatus, the target control amount is corrected to suppress the vibration on the spring of the vehicle taking into account the running characteristic set by the driver. Therefore, even if the driver changes the running characteristic of the vehicle, the vehicle vibration can be effectively suppressed.

In this case, the controller may have a damping characteristic for damping the vibration on the spring of the vehicle, and the damping characteristic may be adjusted according to the running characteristic determined by the running characteristic determination device.

The target control amount may be a target driving force of the vehicle. Also, the controller may include a quadratic notch filter, and a parameter for determining the damping characteristic may be adjusted according to the running characteristic.

Generally, a transfer function where the target driving force of the vehicle is used as an input and the suspension stroke of the vehicle (for example, the stroke of the rear suspension) is used as an output is generally expressed in the form of a quadratic/quartic transfer function. The quadratic/quartic transfer function includes two quadratic transfer functions. One of the quadratic transfer functions does not induce vibration, while the other induces vibration. Accordingly, the target driving force that is the target control amount is corrected using the quadratic notch filter that cancels the pole of the quadratic transfer function included the quadratic/quartic transfer function, which induces vibration. As a result, the vehicle vibration can be suppressed. When the target control amount is corrected using the notch filter, the parameter of the notch filter, that is, the parameter of the correction equation in the form of the quadratic/quadratic function, such as a frequency and a damping ratio, is changed according to the running characteristic set by the driver. As a result, even if the running characteristic of the vehicle is changed, the vehicle vibration can be effectively suppressed.

The controller may include an environment determination device that determines the environment around the vehicle, and the correction amount may be adjusted according to the determined environment.

The controller includes the environment determination device. The controller sets the target control amount based on the instruction that is provided by the driver using operation device such as the accelerator pedal, the brake pedal, and the steering wheel, and/or the instruction from the control device such as the cruise-controller. The environment determination device determines the environment around the vehicle such as the condition of the road on which the vehicle is running. Further, the controller corrects the target control amount to suppress the vibration on the spring of the vehicle. When the controller corrects the target control amount, the correction amount, by which the target control amount is corrected, is adjusted according to the environment around the vehicle determined by the environment determination device. Thus, in the vehicle control apparatus, the target control amount is corrected to suppress the vibration on the spring of the vehicle, taking into account the environment around the vehicle. Therefore, even if the environment around the vehicle changes, the vehicle vibration can be effectively suppressed.

In this case, the controller may have a damping characteristic for damping the vibration on the spring of the vehicle, and the damping characteristic may be adjusted according to the environment around the vehicle determined by the environment determination device.

The target control amount may be a target driving force of the vehicle. Also, the controller may include a quadratic notch filter, and a parameter for determining the damping characteristic may be adjusted according to the environment around the vehicle determined by the environment determination device.

As described above, the target driving force, which is the target control amount, is corrected using the quadratic notch filter that cancels the pole of one quadratic transfer function included in the quadratic/quartic transfer function where the target driving force is used as the input, and the suspension stroke of the vehicle is used as the output. As a result, the vehicle vibration can be suppressed. When the target control amount is corrected using the notch filter, the parameter of the notch filter, that is, the parameter of the correction equation in the form of the quadratic/quadratic function, such as the frequency and the damping ratio, is changed according to the environment around the vehicle. As a result, even if the environment around the vehicle changes, the vehicle vibration can be effectively suppressed.

The controller may include a running condition determination device that determines the running condition of the vehicle, and the correction amount may be adjusted according to the determined running condition.

The controller includes the running condition determination device. The controller sets the target control amount based on the instruction that is provided by the driver using operation device such as the accelerator pedal, the brake pedal, and the steering wheel, and/or the instruction from the control device such as the cruise-controller. The running condition determination device determines the running condition of the vehicle. For example, the running condition determination device determines whether the vehicle is turning. Further, the controller corrects the set target control amount to suppress the vibration on the spring of the vehicle. When the controller corrects the target control amount, the correction amount, by which the target control amount is corrected, is adjusted according to the determined running condition. Thus, in the vehicle control apparatus, the target control amount is corrected to suppress the vibration on the spring of the vehicle, taking into account the running condition of the vehicle. Therefore, even if the running condition changes, the vehicle vibration can be effectively suppressed.

In this case, the controller may have a damping characteristic for damping the vibration on the spring of the vehicle, and the damping characteristic may be adjusted according to the determined running condition.

The target control amount may be a target driving force of the vehicle. Also, the correction device may be a quadratic notch filter, and a parameter for determining the damping characteristic may be adjusted according to the running condition determined by the running condition determination device.

As described above, the target driving force (i.e., the target control amount) is corrected using the quadratic notch filter that cancels the pole of one quadratic transfer function included in the quadratic/quartic transfer function where the target driving force is used as the input, and the suspension stroke of the vehicle is used as the output. As a result, the vehicle vibration can be suppressed. When the target control amount is corrected using the notch filter, the parameter of the notch filter, that is, the parameter of the correction equation in the form of the quadratic/quadratic function, such as the frequency and the damping ratio, is changed according to the running condition of the vehicle. As a result, even if the running condition of the vehicle changes, the vehicle vibration can be effectively suppressed.

The controller may include running characteristic determination device an environment determination device and a running condition determination device. The running characteristic determination device determines the running characteristic of the vehicle set by the driver. The environment determination device determines the environment around the vehicle. The running condition determination device determines the running condition of the vehicle. The correction amount may be adjusted according to at least one of the determined running characteristic, the determined environment around the vehicle, and the determined running condition.

In this case, the controller may have a damping characteristic for damping the vibration on the spring of the vehicle, and the damping characteristic may be adjusted according to at least one of the determined running characteristic, the determined environment around the vehicle, and the determined running condition.

The target control amount may be a target driving force of the vehicle. Also, the controller may include a quadratic notch filter, and a parameter for determining the damping characteristic may be adjusted according to at least one of the determined running characteristic, the determined environment around the vehicle, and the determined running condition.

Another aspect of the invention relates to a method of suppressing vibration of a vehicle, which reduces vibration on a spring of a vehicle. The method includes the steps of setting a target control amount used to control at least a powertrain device of the vehicle based on at least one of an instruction from a driver and an instruction from a predetermined control device included in the vehicle; determining at least one of the running characteristic of the vehicle set by the driver, the environment around the vehicle, and the running condition of the vehicle; setting up a correction equation used to suppress the vibration on the spring of the vehicle based on at least one of the running characteristic, the environment around the vehicle, and the running condition; and correcting the target control amount using the correction equation.

In the method of suppressing vibration of a vehicle, the target control amount may be corrected by changing a damping characteristic for damping the vibration on the spring of the vehicle. The damping characteristic may be adjusted according to at least one of the running characteristic, the environment around the vehicle, and the running condition.

The target control amount may be a target driving force of the vehicle, and a parameter for determining the damping characteristic may be adjusted according to at least one of the running characteristic, the environment around the vehicle, and the running condition.

With the vehicle control apparatus and the method of suppressing vibration of a vehicle according to the invention, the vehicle vibration can be effectively suppressed even if the running characteristic of the vehicle is changed. In addition, the control apparatus and the method of suppressing vibration of the invention effectively suppress vehicle vibration even if the environment around the vehicle or the running condition of the vehicle changes.

BRIEF DESCRIPTION OF THE DRAWINGS

The features, advantages thereof, and technical and industrial significance of this invention will be better understood by reading the following detailed description of the example embodiments of the invention, when considered in connection with the accompanying drawings, in which.

DETAILED DESCRIPTION OF THE EXAMPLE EMBODIMENTS

Figure 1:
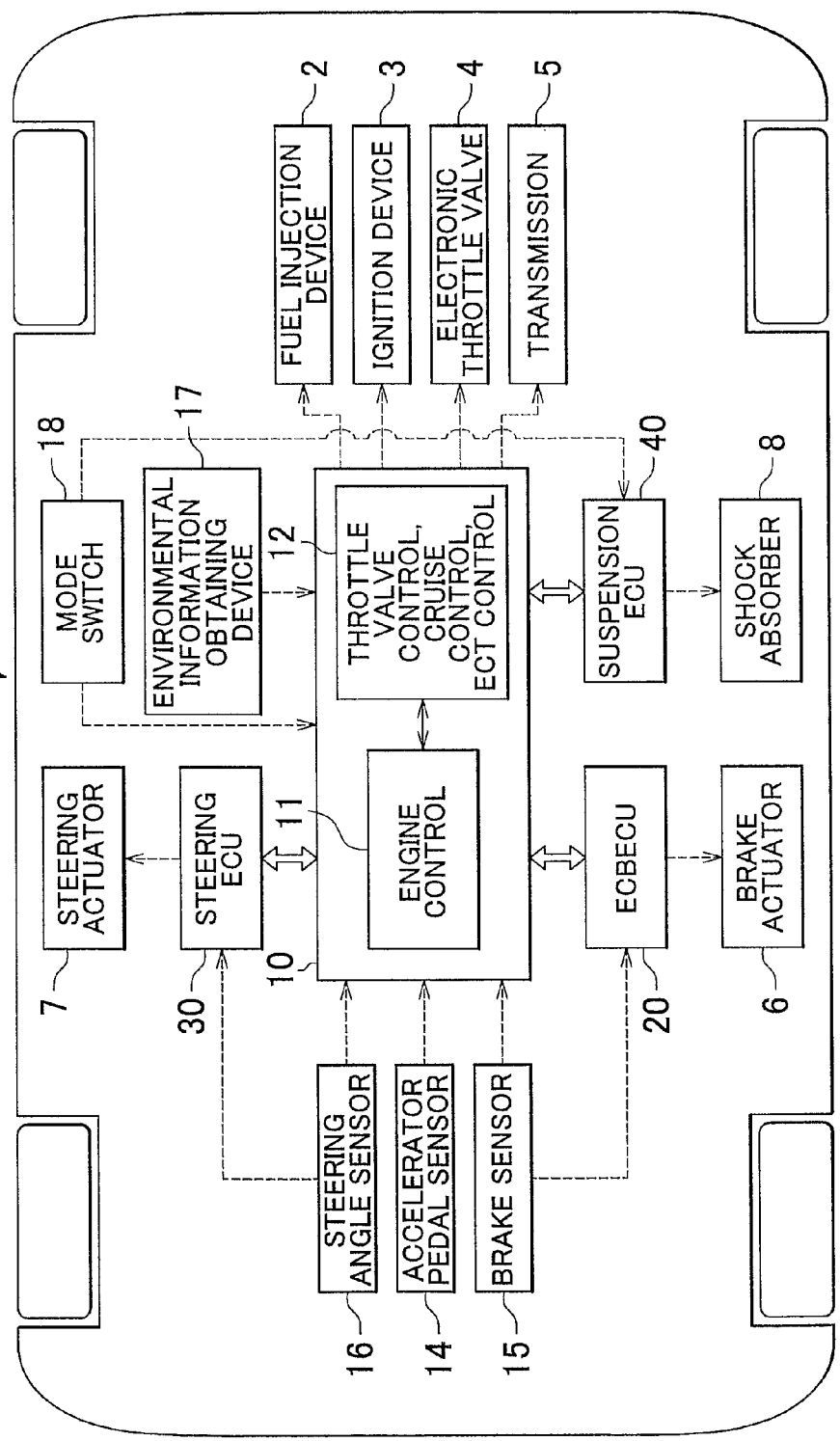
FIG. 1 is a block diagram showing the configuration of a vehicle to which a vehicle control apparatus according to the invention is applied.

In the following description and the accompanying drawings, the present invention will be described in more detail with reference to example embodiments. FIG. 1 is a block diagram showing a vehicle to which a vehicle control apparatus according to the invention is applied. In FIG. 1, a vehicle 1 includes a driving power source, such as an internal combustion engine (not shown), for example, a gasoline engine or a diesel engine. The internal combustion engine may include devices such as a fuel injection device 2, an ignition device 3, and an electronically controlled throttle valve 4 (hereinafter, simply referred to as "throttle valve 4"). The vehicle 1 includes a transmission 5 that transmits power generated by the internal combustion engine to driving wheels. For example, the transmission 5 may be, for example, an automatic transmission or a continuously variable transmission. The vehicle 1 further includes an electronically controlled brake system, a steering device, and an electronically controlled suspension. The electronically controlled brake system includes a brake actuator 6 that is electronically controlled according to the operation amount of a brake pedal. The steering device includes an actuator 7 for steering that is electronically controlled according to the operation amount of a steering wheel, such as a variable gear mechanism and an electric assist unit. The electronically controlled suspension includes a plurality of shock absorbers 8 that are electronically controlled to change damping ratio.

The internal combustion engine and the transmission constitute a powertrain device of the vehicle 1. The powertrain device is controlled by an electronic control unit for controlling the powertrain device (hereinafter, referred to as "powertrain control ECU") 10. The powertrain control ECU 10 includes a first processor 11 and a second processor 12. Each of the first processor 11 and the second processor 12 includes a CPU, ROM, RAM, an input/output interface, and a storage device (none of them are shown). Control programs are stored in the ROM. The RAM is used as a work area where data is stored and programs are executed. The powertrain control ECU 10 is connected to an accelerator pedal sensor 14, a brake sensor 15, and a steering angle sensor 16 via a bus (not shown) and the like.

The accelerator sensor 14 detects the operation amount of an accelerator pedal operated by a driver, and transmits a signal indicating the detected value to the powertrain control ECU 10. The brake sensor 15 detects the operation amount of a brake pedal operated by the driver, and transmits a signal indicating the detected value to the powertrain control ECU 10. Further, the steering sensor 16 detects the steering angle that indicates the steering amount of a steering wheel operated by the driver, and transmits a signal indicating the detected value to the powertrain control ECU 10. The powertrain control ECU 10 controls the aforementioned fuel injection device 2, the ignition device 3, the throttle valve 4, and the transmission 5 to meet the driver's need, according to the driver's instruction indicated by the signals from the sensors 14 to 16, and values detected by other sensors (not shown). In this embodiment, the fuel injection device 2 and the ignition device 3 of the internal combustion engine is controlled mainly by the first processor 11 of the powertrain control ECU 10. The throttle valve 4 is controlled mainly by the second processor 12 of the powertrain control ECU 10. In addition, the second processor 12 controls the transmission 5, and functions as a so-called cruise-controller that assists the driver in driving the vehicle 1. The second processor 12 may also drive the vehicle instead of the driver. The powertrain control ECU 10 does not necessarily control both of the internal combustion engine and the transmission 5. That is, the powertrain control ECU 10 may be configured to control one or both of the internal combustion engine and the transmission 5.

In addition, the powertrain control ECU 10 is connected to an environmental information-obtaining device 17 and a mode-switch 18 via a bus (not shown). In the embodiment, the environmental information-obtaining device 17 includes, for example, a navigation system, a vehicle information communication system (VICS), and an image-capturing unit or an inter-vehicle sensor that obtains the inter-vehicle distance. The environmental information-obtaining device 17 obtains information on the condition of the road on which the vehicle 1 is running, the inter-vehicle distance, and the like. The environmental information-obtaining device 17 supplies the obtained information to the powertrain control ECU 10. The environmental information-obtaining device 17 may include a radar unit that can obtain various kinds of information.

The mode-switch 18 is used to change the damping ratio of each of the plurality of shock absorbers 8 in the electronically controlled suspension system. By operating the mode-switch 18, the running characteristic of the vehicle 1, that is, the running mode can be changed. In this embodiment, when the driver turns off the mode-switch 18, the damping ratio of each shock absorber 8 is set to a standard value. As a result, the running mode of the vehicle 1 is set to a normal mode. When the mode-switch 18 is turned on, and a "first mode" is selected, the damping ratio of each shock absorber 8 is set to a value lower than the standard value. As a result, the running mode of the vehicle 1 is set to a power mode. In the power mode, priority is given to acceleration performance of the vehicle 1 over suppression of vibration of the vehicle 1. In a "second mode" that may be selected using the mode-switch 18, the damping ratio of each shock absorber 8 is set to a value higher than the standard value. As a result, the running mode is set to a comfort mode. In the comfort mode, priority is given to suppression of vehicle vibration 1 over acceleration performance of the vehicle 1.

The powertrain control ECU 10 is connected to an ECBECU (ECU for the electronically-controlled brake) 20, a steering ECU 30, and a suspension ECU 40 via bus (not shown) and the like, or by wireless communication. The ECBECU 20 controls the aforementioned electronically controlled brake system. That is, the ECBECU 20 controls the brake actuator 6 and the like based on values detected by the sensors including the brake sensor 15. The ECBECU 20 in the embodiment can execute vehicle stability control to ensure stability of the vehicle 1 while the vehicle 1 turns. The steering ECU 30 controls the steering device of the vehicle 1. That is, the steering ECU 30 controls the actuator 7 for steering, and the like based on values detected by the sensors including the steering sensor 16. The suspension ECU controls the aforementioned electronically controlled suspension. That is, the suspension ECU executes the control to change the damping ratio of each shock absorber 8 according to the operation of the mode-switch 18 operated by the driver. A throttle valve opening amount sensor, a vehicle speed sensor, a longitudinal acceleration sensor, a yaw rate sensor, and the like (none of them are shown) supply information necessary for the control to the powertrain control ECU 10, the ECBECU 20, the steering ECU 30, and the suspension ECU 40.

Figure 2:
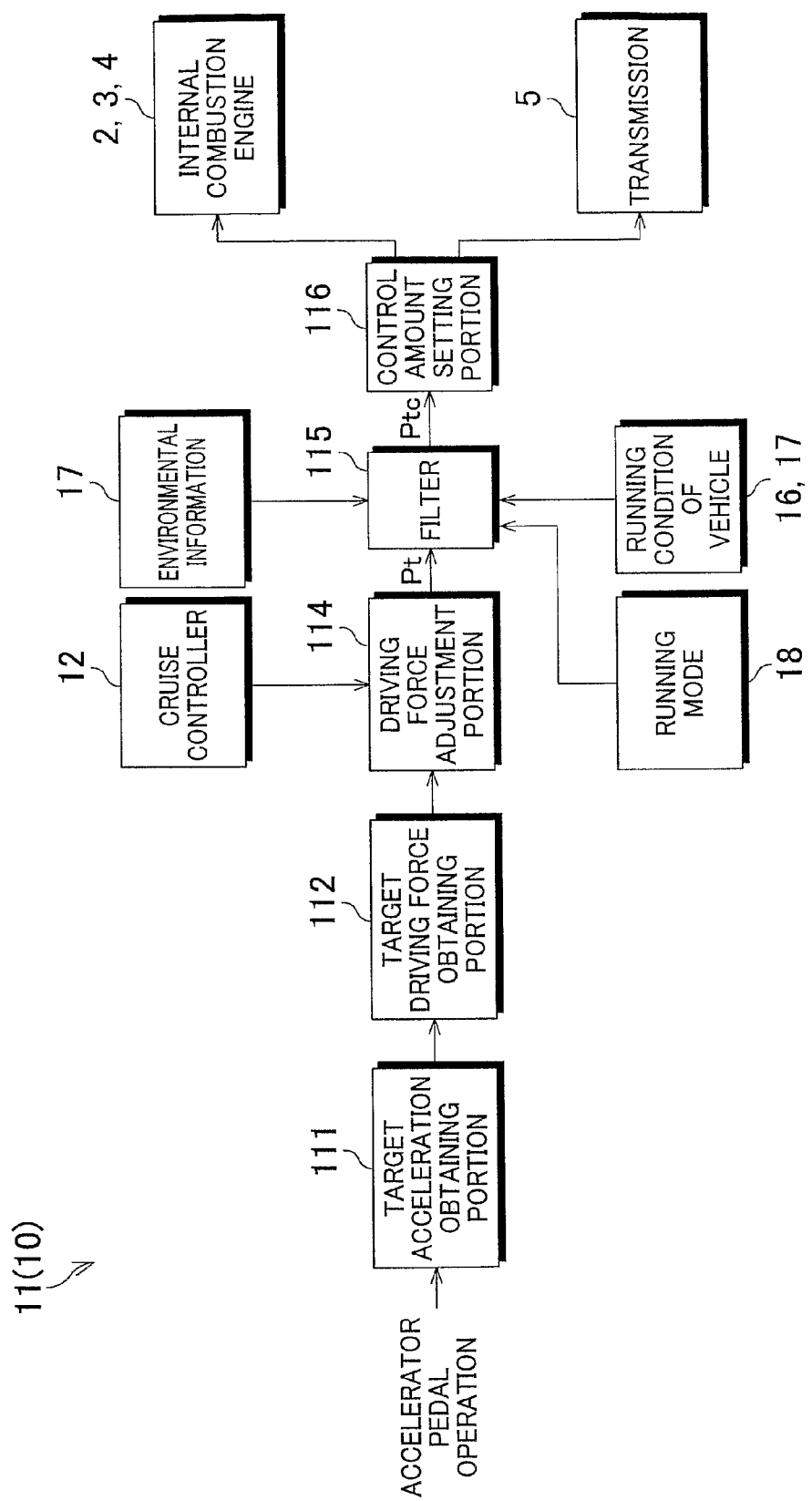
FIG. 2 is a control block diagram describing basic steps of control of an internal combustion engine and a transmission, which is executed by the vehicle control apparatus according to the invention.

FIG. 2 is a control block diagram describing basic steps of control executed by the powertrain control ECU 10. Basically, the control related to FIG. 2 is executed by the first processor 11 of the powertrain control ECU 10. As shown in FIG. 2, the first processor 11 includes a target acceleration determination portion 111, a target driving-force obtaining portion 112, a driving force adjustment portion 114, a filter 115, and a control-amount setting portion 116. The target acceleration determining portion 111 obtains the target acceleration of the vehicle 1 based on the operation amount of the accelerator pedal indicated by the signal from the accelerator pedal sensor 14, using, for example, a map that defines the relation between the operation amount of the accelerator pedal and the target acceleration of the vehicle 1. Then, the target acceleration determining portion 111 transmits the signal indicating the obtained value to the driving power adjustment portion 114.

The driving force adjustment portion 114 sets a target driving force Pt of the internal combustion engine based on the signal from the target driving-force obtaining portion 112 and at least one of an instruction from the driver and an instruction from the second processor 12 that is the control device included in the vehicle 1. In the embodiment, the second processor 12 of the powertrain control ECU 10 functions as the so-called cruise-controller that assists the driver in driving the vehicle 1. The second processor 12 may also drive the vehicle 1 instead of the driver. Therefore, when the driver provides an instruction to execute the cruise control, the second processor 12 transmits an instruction for the driving force necessary for the cruise control to the driving force adjustment portion 114 of the first processor 11. In this case, basically, the driving force adjustment portion 114 sets the target driving force Pt of the internal combustion engine by adding the driving force requested by the second processor 12 to the target driving force obtained by the target driving-force obtaining portion 112. When the sum of the target driving force obtained by the target driving-force obtaining portion 112 and the driving force requested by the second processor 12 is not in a predetermined guard range, the driving force adjustment portion 114 execute guard processing so that the target driving force Pt becomes equal to the upper limit value or the lower limit value of the guard range. When the target driving force Pt is not in the guard range, this guard processing may invalidate the instruction from the second processor 12.

The filter 115 corrects the final driving force Pt set by the driving force adjustment portion 114 to suppress vibration on a spring of the vehicle 1. In the embodiment, as the filter 115, a quadratic notch filter is used. Output from the filter 115, that is, a corrected target driving force Ptc is supplied to the control-amount setting portion 116. The control-amount setting portion 116 sets the control amount of each of the fuel injection device 2, the ignition device 3, the throttle valve 4, and the transmission 5 based on the corrected target driving force Ptc. The first processor 11 or the second processor 12 generates and transmits a control signal to each of the fuel injection device 2, the ignition device 3, the throttle valve 4, and the transmission 5 based on the control amount set by the control-amount setting portion 116. Thus, the internal combustion engine and the transmission 5 of the vehicle 1 are controlled to meet the driver's need.

In this embodiment, a quadratic notch filter is provided as the filter 115 for the first processor 11 of the powertrain control ECU 10 for the following reason. For example, in the case where the vehicle 1 is a rear-wheel-drive vehicle, a transfer function where the target driving force of the vehicle is used as an input and the rear suspension stroke of the vehicle is used as an output is generally expressed in the form of a quadratic/quartic transfer function represented by the following equation (1).

$$Px_r(s) = K \times \frac{\omega_{n1}^2 \times \omega_{n2}^2}{z_1 \times z_2} \times \frac{s - z_1}{s^2 + 2\zeta_1 \times \omega_{n1} \times s + \omega_{n1}^2} \times \frac{s - z_2}{s^2 + 2\zeta_2 \times \omega_{n2} \times s + \omega_{n2}^2} = K \times G_1(s) \times G_2(s) \quad (1)$$

The quadratic/quartic transfer function includes two quadratic transfer functions $G_1(s)$ and $G_2(s)$. When the equation (1) is set up, a damping ratio $\zeta_1$ of the quadratic transfer function $G_1(s)$ induces vibration. A damping ratio $\zeta_2$ of the quadratic transfer function $G_2(s)$ does not induce vibration. Therefore, the quadratic transfer function $G_2(s)$ of the equation (1) does not induce vibration, but the quadratic transfer function $G_1(s)$ induces vibration. Accordingly, the target driving force Pt that is the target control amount is corrected using the filter 115. The filter 115 is the quadratic notch filter that cancels the pole of the quadratic transfer function $G_1(s)$ included in the quadratic/quartic transfer function represented by the equation (1), which induces vibration. As a result, the vehicle vibration 1 can be suppressed.

The quadratic notch filter that cancels the pole of the quadratic transfer function $G_1(s)$ in the equation (1) is expressed in the form of a quadratic/quadratic transfer function represented by the following equation (2).

$$C(s) = \frac{s^2 + 2\zeta_p \times \omega_p \times s + \omega_p^2}{s^2 + 2\zeta_m \times \omega_m \times s + \omega_m^2} \quad (2)$$

In the equation (2), $\omega_m$ is a reference frequency, $\zeta_m$ is a reference damping ratio, $\omega_p$ is a plant frequency of a driving system of the vehicle 1 that functions as a plant, and $\zeta_p$ is a plant damping ratio. The first processor 11 of the powertrain control ECU 10 is provided with the filter 115 that corrects the target driving force Pt based on the correction equation (2).

In this case, the parameters of the equation (2), that are, the reference frequency $\omega_m$, the reference damping ratio $\zeta$m, the plant frequency $\omega_p$, and the plant damping ratio $\zeta_p$ are changed according to the changes in the running characteristic (i.e., the running mode) of the vehicle 1, the environment around the vehicle 1, the running condition of the vehicle 1, and the like. That is, when the target driving force Pt is corrected using the filter 115, the reference frequency $\omega_m$, the reference damping ratio $\zeta_m$, the plant frequency $\omega_p$, and the plant damping ratio $\zeta_p$ that are used to set the damping characteristic of the filter 115 (correction equation) are changed according to the running mode of the vehicle 1 set by the driver, the environment around the vehicle 1, and the running condition of the vehicle 1. As a result, vehicle vibration 1 can be constantly and effectively suppressed.

Figure 3:
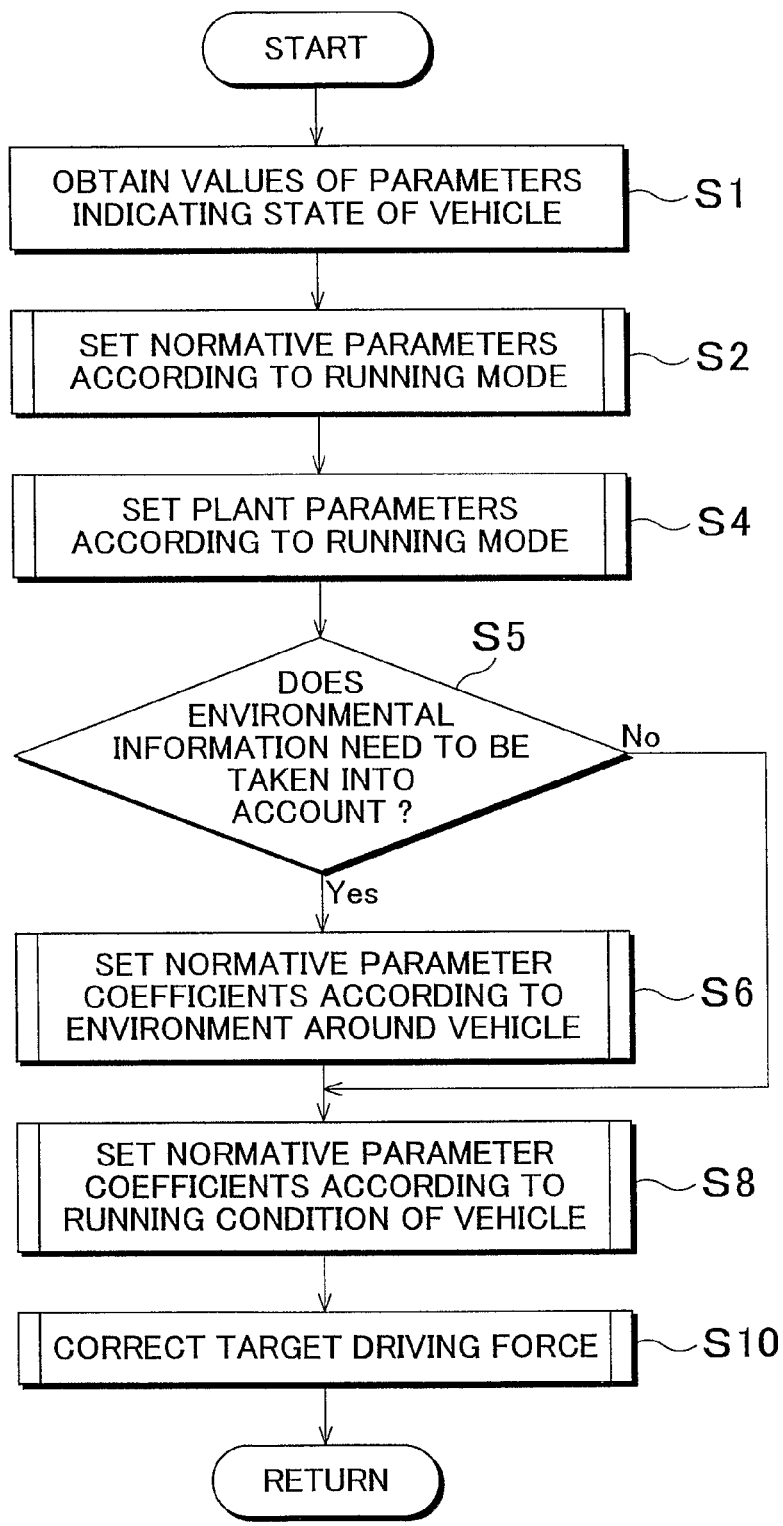
FIG. 3 is a flowchart describing steps of correcting a target driving force of the vehicle while changing the parameter of a filter according to the running characteristic of the vehicle, the environment around the vehicle, and the running condition of the vehicle.

In the vehicle 1 according to the embodiment, a routine shown in FIG. 3 is executed to correct the target driving force Pt while changing the parameters used to set the damping characteristic of the filter 115 according to the running characteristic of the vehicle 1, the environment around the vehicle 1, and the running condition of the vehicle 1. The routine in FIG. 3 is repeatedly executed by the first processor 11 of the powertrain control ECU 10 at predetermined time intervals. When the routine is executed, the first processor 11 obtains the values of the parameters indicating the state of the vehicle 1, such as the vehicle speed of the vehicle 1, and the operation amount of the accelerator pedal or the brake pedal (S1). Then, the first processor 11 executes a reference parameter setting process to set each reference parameter of the filter 115 according to the running mode of the vehicle 1 (S2).

After the process in step S2 is executed, the first processor 11 executes a plant parameter setting process to set each plant parameter of the filter 115 according to the running mode of the vehicle 1 (S4). Further, the first processor 11 determines whether the environment around the vehicle 1 needs to be taken into account when the filter 115 executes a correction process (S5). If the first processor 11 determines that the environment around the vehicle 1 needs to be taken into account when the filter 115 executes the correction process based on a predetermined criterion (YES in step S5), the first processor 11 executes the process of setting a reference parameter coefficient by which each reference parameter of the filter 115 is multiplied according to the environmental information obtained by the environmental information-obtaining device 17 (S6). If it is determined that the environment around the vehicle 1 does not need to be taken into account when the filter 115 executes the correction process (NO in step S5), the process of setting the reference parameter coefficients (S6) is skipped. Subsequently, the first processor 11 executes the process of setting the reference parameter coefficient by which each reference parameter of the filter 115 is multiplied, according to the running condition of the vehicle 1 (S8). Then, the first processor 11 executes the process of correcting the target driving force Pt using the filter 115 (S10).

Figure 4:
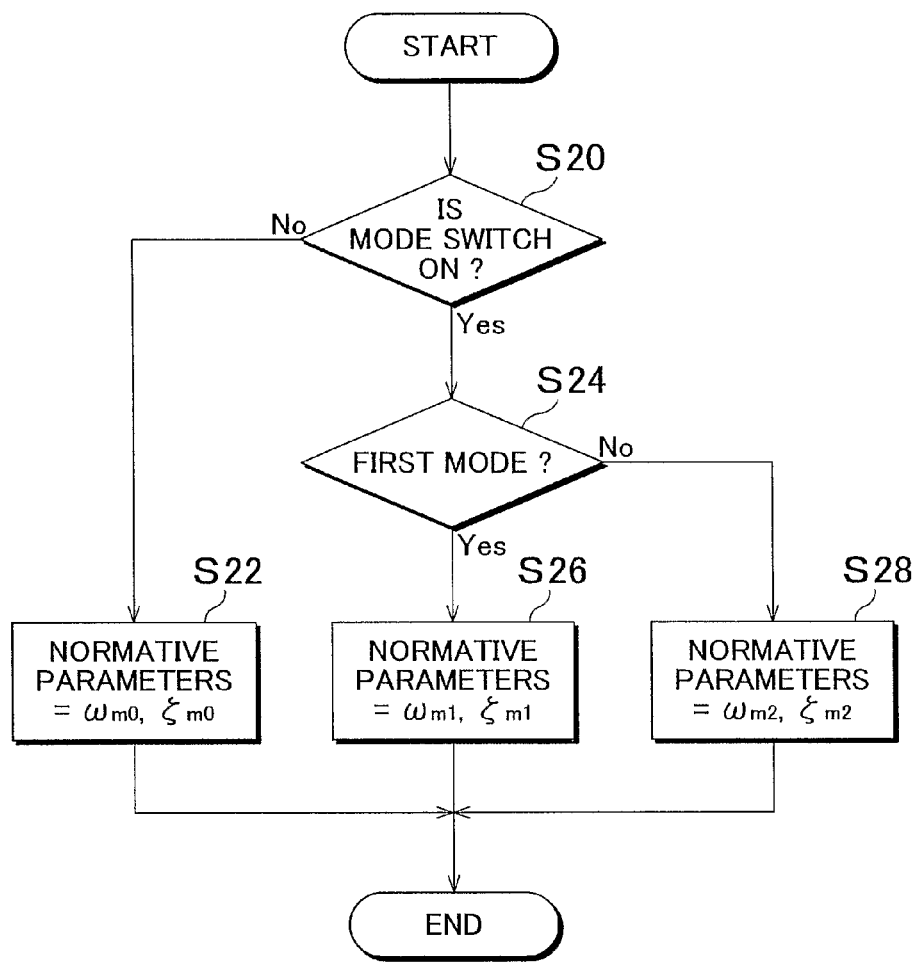
FIG. 4 is a flowchart describing a reference parameter setting process that is executed when the target driving force is corrected.

FIG. 4 is a flowchart describing the reference parameter setting process in step S2. As shown in FIG. 4, the first processor 11 of the powertrain control ECU 10 determines whether the mode-switch 18 is ON (S20). If the first processor 11 determines that the mode-switch 18 is off and the driver sets the running mode of the vehicle 1 to the normal mode (NO in step S20), the first processor 11 reads a reference frequency $\omega_{m0}$ and a reference damping ratio $\zeta_{m0}$ for the normal mode from a predetermined storage device. Then, the first processor 11 stores the values in a predetermined storage area as the reference parameters used as basic parameters (S22).

Meanwhile, if the first processor 11 determines that the mode-switch 18 is on (YES in step S20), the first processor 11 determines whether the mode-switch 18 is set to the first mode where priority is given to the acceleration performance of the vehicle 1 (S24). If the first processor 11 determines that the mode-switch 18 is set to the first mode, and the driver sets the running mode of the vehicle 1 to the power mode (YES in step S24), the first processor 11 reads the reference frequency $\omega_{m1}$ and the reference damping ratio $\zeta_{m1}$ for the power mode from the predetermined storage device, and stores the values in a predetermined storage area as the reference parameters used as basic parameters (S26).

If the first processor 11 determines that the mode-switch 18 is on in step S20, and determines that the mode-switch 18 is not set to the first mode in step S24, it is determined that the driver sets the running mode of the vehicle 1 to the second mode, that is, the comfort mode where priority is given to suppression of the vehicle vibration 1 (NO in step S24). Accordingly, if a negative determination is made in step S24, the first processor 11 reads a reference frequency $\omega_{m2}$ and a reference damping ratio $\zeta_{m2}$ for the comfort mode from the predetermined storage device, and stores the values in a predetermined storage area as the reference parameters used as basic parameters (S28).

The reference parameters $\omega_{m0}$ and $\zeta_{m0}$ for the normal mode, $\omega_{m1}$ and $\zeta_{m1}$ for the power mode, $\omega_{m2}$ and $\zeta_{m2}$ for the comfort mode are set in advance through experiment and analysis, and are stored in the storage device of the powertrain control ECU 10. Hereinafter, the reference parameters $\omega_{m0}$, $\omega_{m1}$, and $\omega_{m2}$ will be sometimes collectively referred to as "$\omega_{mi}$", and the reference parameters $\zeta_{m0}$, $\zeta_{m1}$, and $\zeta_{m2}$ will be sometimes collectively referred to as "$\zeta_{mi}$". The suffix "i" signifies the running mode of the vehicle 1 set by the mode-switch 18. The suffix "0" signifies the normal mode, the suffix "1" signifies the power mode, and the suffix "2" signifies the comfort mode.

Figure 5:
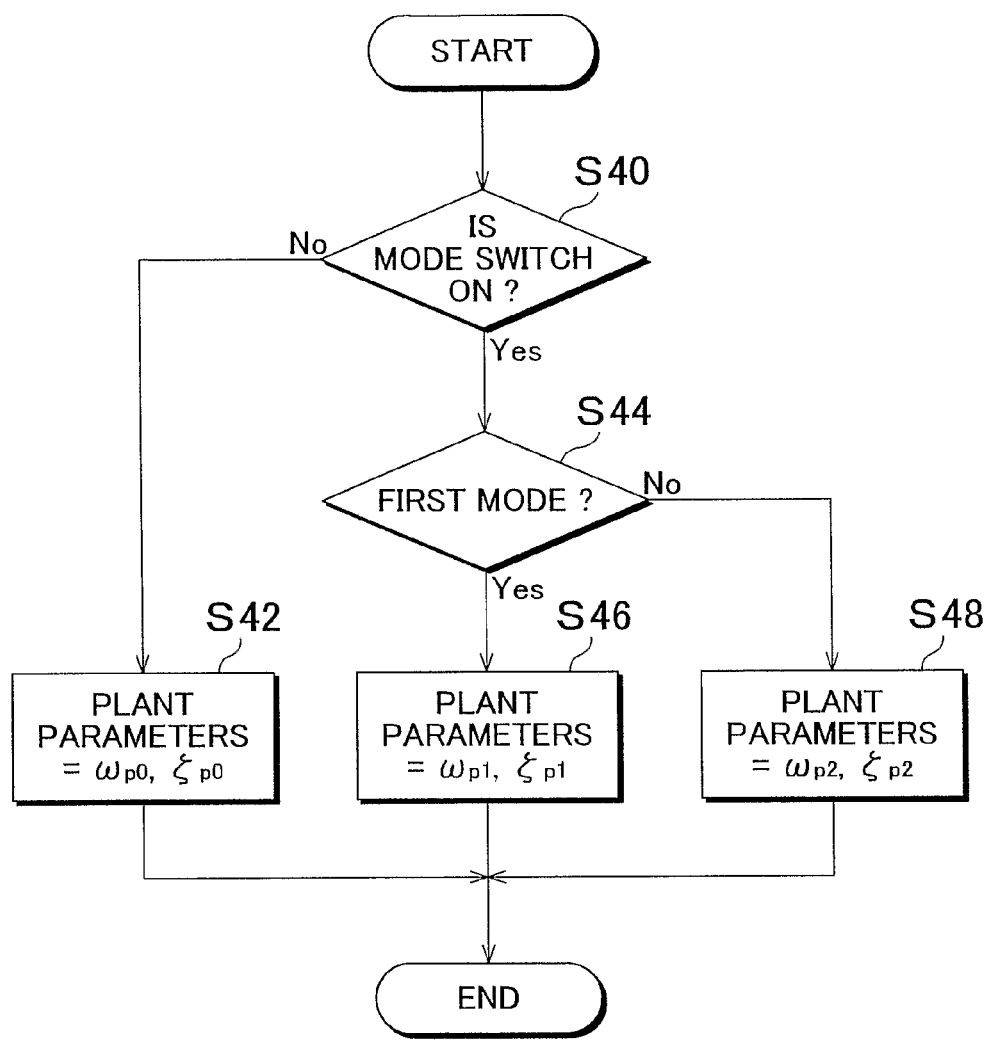
FIG. 5 is a flowchart describing a plant parameter setting process that is executed when the target driving force is corrected.

After the reference frequency $\omega_{mi}$ and the reference damping ratio $\zeta_{mi}$ are set in step S22, S26 or S28, the plant parameter setting process is executed in step S4. FIG. 5 is a flowchart describing the plant parameter setting process in step S4. In this case, the first processor 11 of the powertrain control ECU 10 determines whether the mode-switch 18 is on (S40). If the first processor 11 determines that the mode-switch 18 is off, and the running mode of the vehicle 1 is set to the normal mode (NO in step S40), a plant frequency $\omega_{p0}$ and a plant damping ratio $\zeta_{p0}$ for the normal mode are read from the predetermined storage device, and the values are stored in a predetermined storage area as the plant parameters used as basic parameters (S42).

If the first processor 11 determines that the mode-switch 18 is on (YES in step S40), the first processor 11 determines whether the mode-switch 18 is set to "the first mode" (S44). If the first processor 11 determines that the mode-switch 18 is set to "the first mode", and the driver sets the running mode of the vehicle 1 to the power mode (YES in step S44), the first processor 11 reads a plant frequency $\omega_{p1}$ and a plant damping ratio $\zeta_{p1}$ for the power mode from the predetermined storage device, and stores the values in a predetermined storage area as the plant parameters used as basic parameters (S46). If the first processor 11 determines that the mode-switch 18 is on and the mode-switch 18 is not set to the first mode (NO in step S44), the first processor 11 reads a plant frequency $\omega_{p2}$ and a plant damping ratio $\zeta_{p2}$ for the comfort mode from the predetermined storage device, and stores the values in a predetermined storage area as the plant parameters used as basic parameters (S48).

The plant parameters $\omega_{p0}$ and $\zeta_{p0}$ for the normal mode, $\omega_{p1}$ and $\zeta_{p1}$ for the power mode, $\omega_{p2}$ and $\zeta_{p2}$ for the comfort mode are set in advance through experiment and analysis, and are stored in the storage device of the powertrain control ECU 10. Hereinafter, the plant parameters $\omega_{p0}$, $\omega_{p1}$, and $\omega_{p2}$ will be sometimes collectively referred to as "$\omega_{pi}$", and the plant parameters $\zeta_{p0}$, $\zeta_{p1}$, and $\zeta_{p2}$ will be sometimes collectively referred to as "$\zeta_{pi}$". The electronically controlled suspension of the vehicle 1 has the function of adjusting the vehicle height. For example, in the case where a plurality of vehicle heights can be set in each running mode, a plurality of plant parameters corresponding to the plurality of vehicle heights may be provided for each of the normal mode, the power mode, and the comfort mode, and the plant parameters corresponding to the selected vehicle height may be set.

Figure 6:
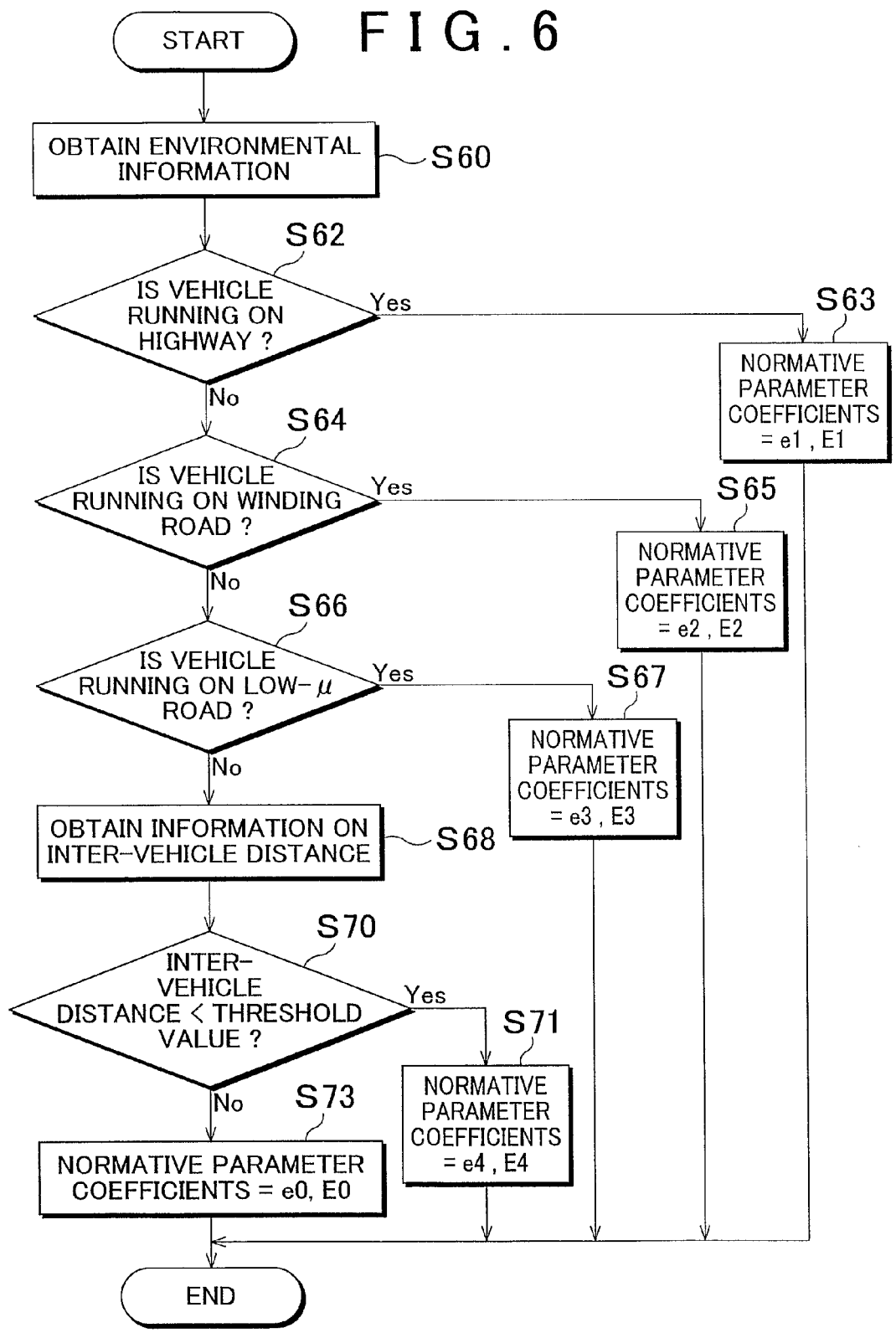
FIG. 6 is a flowchart describing the process of setting reference parameter coefficients according to the environment around the vehicle.

In step S42, and step S46 or step S48, the plant frequency $\omega_{pi}$ and the plant damping ratio $\zeta_{pi}$ are set. If an affirmative determination is made in step S5, the process of setting reference parameter coefficients is executed in step S6. FIG. 6 is a flowchart describing the process of setting the reference parameter coefficients according to the environment around the vehicle 1. As shown in FIG. 6, when the reference parameter coefficients are set according to the environment around the vehicle, the first processor 11 of the powertrain control ECU 10 obtains the information on the environment around the vehicle 1 from the navigation system and the like of the environmental information-obtaining device 17 (S60). The first processor 11 determines whether the vehicle 1 is running on a highway such as an express way (S62). If the first processor 11 determines that the vehicle 1 is running on the highway (YES in step S62), the first processor 11 reads, from the predetermined storage device, a reference parameter coefficient e1 and a reference parameter coefficient E1, and stores the values in a predetermined storage area (S63). When the vehicle 1 is running on the highway, the reference frequency $\omega_{mi}$ that is set by the reference parameter setting process in step S2 is multiplied by the reference parameter coefficient e1, and the reference damping ratio $\zeta_{mi}$ that is also set by the reference parameter setting process in step S2 is multiplied by the reference parameter coefficient E1.

If the first processor 11 determines that the vehicle 1 is not running on the highway (NO in step S62), the first processor 11 determines whether the vehicle 1 is running on a winding road based on the information on the environment around the vehicle (S64). If the first processor 11 determines that the vehicle 1 is running on the winding road (YES in step S64), the first processor 11 reads, from the predetermined storage device, a reference parameter coefficient e2 and a reference parameter coefficient E2, and stores the values in a predetermined storage area (S65). When the vehicle 1 is running on the winding road, the reference frequency $\omega_{mi}$ that is set by the reference parameter setting process in step S2 is multiplied by the reference parameter coefficient e2, and the reference damping ratio $\zeta_{mi}$ that is also set by the reference parameter setting process in step S2 is multiplied by the reference parameter coefficient E2.

If the first processor 11 determines that the vehicle 1 is not running on the winding road (NO in step S64), the first processor 11 determines whether the vehicle 1 is running on a low-friction coefficient road (hereinafter, referred to as "low-µ road") based on the information on the environment around the vehicle (S66). If the first processor 11 determines that the vehicle 1 is running on the low-µ road (YES in step S66), the first processor 11 reads, from the predetermined storage device, a reference parameter coefficient e3 and a reference parameter coefficient E3, and stores the values in a predetermined storage area (S67). When the vehicle 1 is running on the low-µ road, the reference frequency $\omega_{mi}$ that is set by the reference parameter setting process in step S2 is multiplied by the reference parameter coefficient e3, and the reference damping ratio $\zeta_{mi}$ that is also set by the reference parameter setting process in step S2 is multiplied by the reference parameter coefficient E3.

If the first processor 11 determines that the vehicle 1 is not running on the low-µ road (NO in step S66), the first processor 11 obtains the distance between the vehicle 1 and a preceding vehicle from the image-capturing unit and the like (S68). The image-capturing unit included in the environmental information-obtaining device 17 obtains the inter-vehicle distance. The first processor 11 determines whether the distance between the vehicle 1 and the preceding vehicle is less than a threshold value (S70). If the first processor 11 determines that the distance between the vehicle 1 and the preceding vehicle is less than the threshold value (YES in step S70), the first processor 11 reads, from the predetermined storage device, a reference parameter coefficient e4 and a reference parameter coefficient E4, and stores the values in a predetermined storage area (S71). When the distance between the vehicle 1 and the preceding vehicle is less than the threshold value, the reference frequency $\omega_{mi}$ that is set by the reference parameter setting process in step S2 is multiplied by the reference parameter coefficient e4, and the reference damping ratio $\zeta_{mi}$ that is also set by the reference parameter setting process in step S2 is multiplied by the reference parameter coefficient E4.

If the first processor 11 determines that the distance between the vehicle 1 and the preceding vehicle is greater than or equal to the threshold value (NO in step S70), the first processor 11 may determine that the vehicle 1 is running on an uncrowded ordinary road, and the first processor 11 reads, from the predetermined storage device, a reference parameter coefficient e0 and a reference parameter coefficient E0, and stores the values in a predetermined storage area (S73). When the vehicle 1 is normally running on the ordinary road, the reference frequency $\omega_{mi}$ that is set by the reference parameter setting process in step S2 is multiplied by the reference parameter coefficient e0, and the reference damping ratio $\zeta_{mi}$ that is also set by the reference parameter setting process in step S2 is multiplied by the reference parameter coefficient E0. The reference parameter coefficients e0, E0, e1, E1, e2, E2, e3, E3, e4, and E4 are determined empirically, and stored in the storage device of the powertrain control ECU 10. Hereinafter, the reference parameter coefficients e0, e1, e2, e3, and e4 will be sometimes collectively referred to as "ej", and the reference parameter coefficients E0 E1, E2, E3, and E4 will be sometimes collectively referred to as "Ej". The suffix "j" signifies the environment around the vehicle. The suffix "0" signifies that the vehicle 1 is normally running on the ordinary road, the suffix "1" signifies that the vehicle 1 is running on the highway. The suffix "2" signifies that the vehicle 1 is running on the winding road. The suffix "3" signifies that the vehicle 1 is running on the low-μ road. The suffix "4" signifies that the distance between the vehicle 1 and the preceding vehicle is short.

Figure 7:
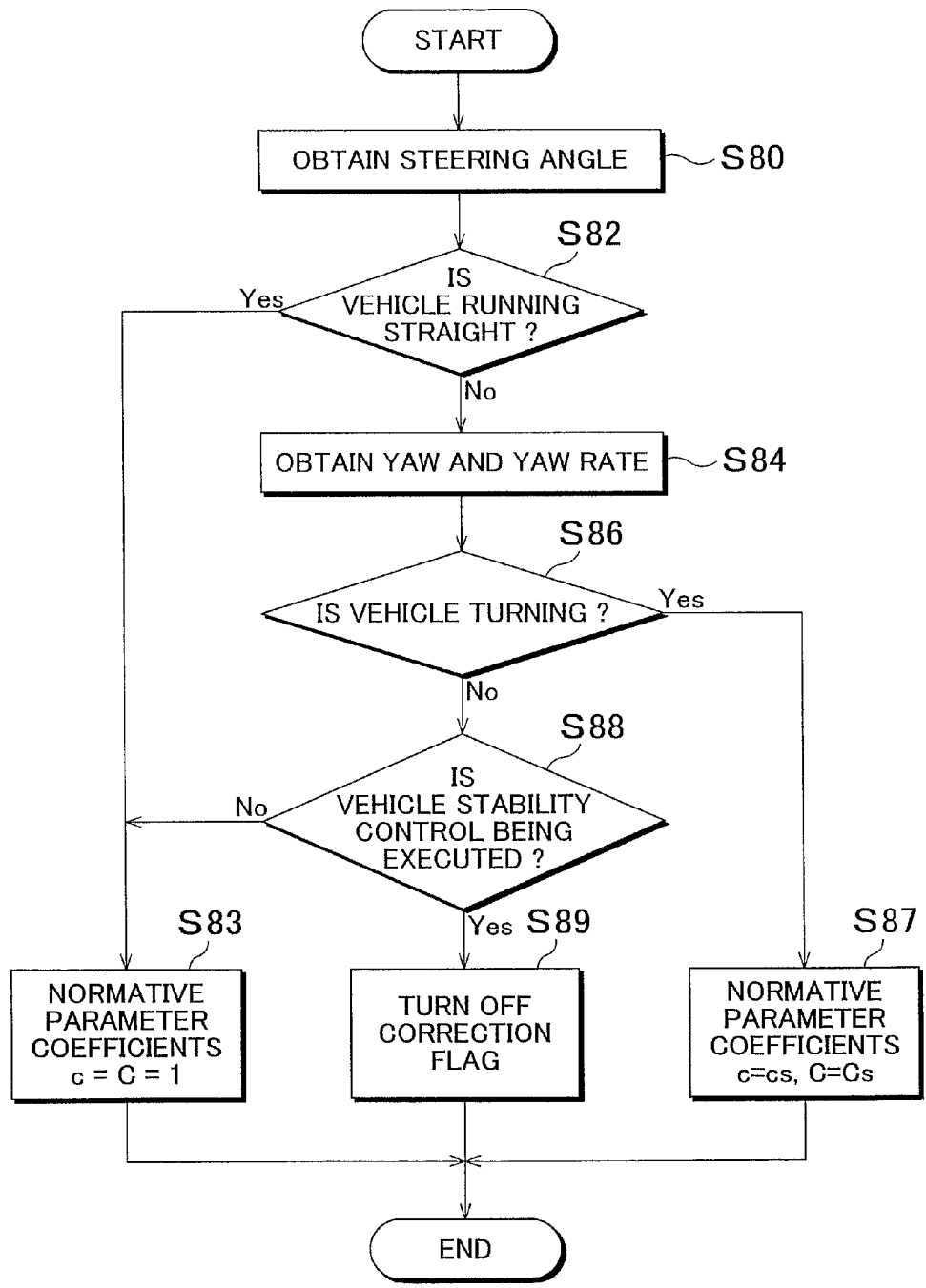
FIG. 7 is a flowchart describing the process of setting reference parameter coefficients according to the running condition of the vehicle.

After the process in step S4 is executed, or after the reference parameter coefficients ej and Ej are set in step S63, S65, S67, S71, or S73, the process of setting reference parameter coefficients is executed in step S8. FIG. 7 is a flowchart describing the process of setting the reference parameter coefficients according to the running condition of the vehicle 1. As shown in FIG. 7, when the reference parameter coefficients are set according to the running condition of the vehicle 1, the first processor 11 of the powertrain control ECU 10 obtains the steering angle that indicates the steering amount of the steering wheel operated by the driver, based on the signal from the steering angle sensor 16 (S80). Then, the first processor 11 determines whether the vehicle 1 is running straight based on the obtained steering angle (S82).

In this embodiment, the aforementioned reference parameters $\omega_{mi}$ and $\zeta_{mi}$ are set on the assumption that the vehicle 1 is running straight. Therefore, if the first processor 11 determines that the vehicle 1 is running straight (YES in step S82), the first processor 11 sets a reference parameter coefficient "c" to "1", and sets a reference parameter coefficient "C" to "1" (S83). The reference parameter coefficients "c" and "C" are set according to the running condition of the vehicle 1. The reference frequency $\omega_{mi}$ that is set by the reference parameter setting process in step S2 is multiplied by the reference parameter coefficient "c". The reference damping ratio $\zeta_{mi}$ that is also set by the reference parameter setting process in step S2 is multiplied by the reference parameter coefficient "C".

If the first processor 11 determines that the vehicle 1 is not running straight (NO in step S82), the first processor 11 obtains a yaw rate of the vehicle 1 from a yaw rate sensor (S84), and determines whether the vehicle 1 is turning (S86). If the first processor 11 determines that the vehicle 1 is turning (YES in step S86), the first processor 11 sets the reference parameter coefficient "c" to "cs", and sets the reference parameter coefficient "C" to "Cs" (S87). The values "cs" and "Cs" are set in advance through experiment and analysis, and are stored in the storage device of the powertrain control ECU 10.

Further, if the first processor 11 determines that the vehicle 1 is not turning in step S86 (NO in step S86), the first processor 11 determines whether the ECBECU 20 is executing the vehicle stability control (S88). If the first processor 11 determines that the ECBECU 20 is not executing the vehicle stability control (NO in step S88), the first processor 11 determines that the vehicle 1 is running straight, and sets the reference parameters "c" and "C" to "1" (S83). If the first processor 11 determines that the ECBECU 20 is executing the vehicle stability control (YES in step S88), the first processor 11 turns a predetermined correction flag off to prohibit the processes in step S2 and subsequent steps of the routine in FIG. 3 (S89). When the ECBECU 20 is executing the vehicle stability control, priority needs to be given to the driving stability of the vehicle 1 over suppression of vehicle vibration 1. Accordingly, in this embodiment, when the ECBECU 20 is executing the vehicle stability control, the correction flag is turned off to prohibit the process of correcting the target driving force Pt, which may affect the accuracy of the vehicle stability control.

Figure 8:
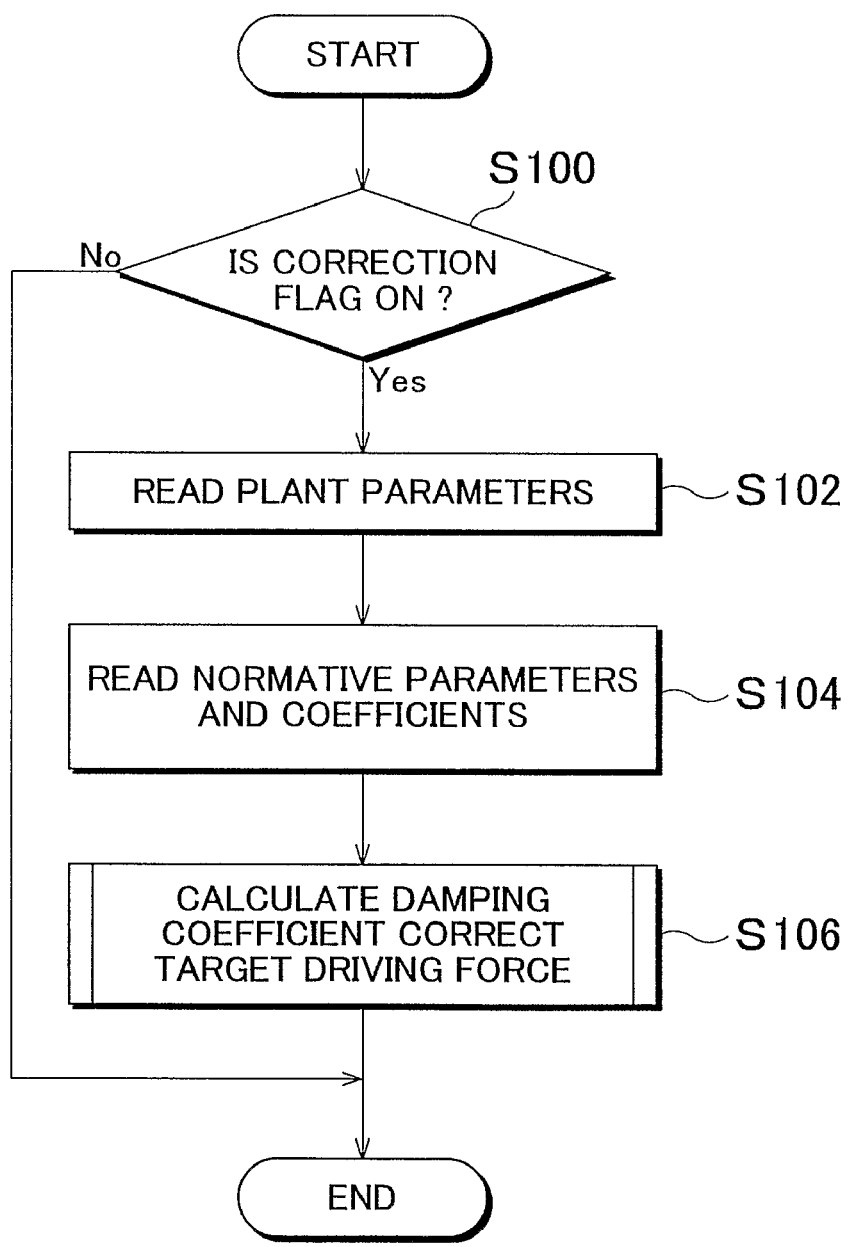
FIG. 8 is a flowchart describing the process of correcting the target driving force.

After the reference parameters $\omega_{mi}$ and $\zeta_{mi}$, the plant parameters $\omega_{pi}$ and $\zeta_{pi}$, and the reference parameter coefficients ej and Ej, "c" and "C" are set in steps S2 to S8, the process of correcting the target driving force Pt is executed in step S10. FIG. 8 is a flowchart describing the process of correcting the target driving force. As shown in FIG. 8, the first processor 11 determines whether the correction flag is on (S100). If the first processor determines that the correction flag is off (NO in step S100), the first processor determines that the ECBECU 20 is executing the vehicle stability control. Therefore, in this case, the processes in step S102 and subsequent steps are skipped, and the process of correcting the target driving force Pt, which may affect the accuracy of the vehicle stability control, is not executed.

If the first processor 11 determines that the correction flag is on (YES in step S100), the first processor 11 reads, from the predetermined storage area, the plant frequency $\omega_p$ and the plant damping ratio $\zeta_p$ which are set by the plant parameter setting process in step S4 (S102). Further, the first processor 11 reads, from the predetermined storage area, the reference frequency $\omega_{mi}$ and the reference damping ratio $\zeta_{mi}$ which are set by the reference parameter setting process in step S2. Also, the first processor 11 reads, from the predetermined storage area, the reference parameter coefficients ej and Ej that are set based on the environment around the vehicle in step S6 and the reference parameter coefficients "c" and "C" that are set based on the running condition in step S8 (S104).

After the process in step S104 is executed, the first processor 11 substitutes the values of the plant frequency $\omega_p$ and the plant damping ratio $\zeta_p$ read in step S102 into the aforementioned equation (2). The first processor 11 also substitutes the following equations into the aforementioned equation (2).

$$\omega_m = \omega_{mi} \times e_j \times c$$

$$\zeta_m = \zeta_{mi} \times E_j \times C$$

Then, the first processor 11 converts the equation (2) into which the reference parameters and the plant parameters are substituted, using Tustin model (i.e., the first processor 11 executes Tustin conversion), and obtains a correction equation H (z) that defines the damping characteristic of the filter 115 using the following equation (3). Thus, the filter 115 outputs the corrected target driving force Ptc represented by the equation, Ptc=Pt×H(z) (S106).

$$H(z) = \frac{b_{12} \times z^{-2} + b_{11} \times z^{-1} + b_{10}}{a_{12} \times z^{-2} + a_{11} \times z^{-1} + 1} = \frac{N_1}{D_1} \qquad (3)$$

In the equation (3), $z^{-1}$ is the value of Pt×H (z) or Ptc obtained during the routine executed last time, that is, the corrected target driving force that is obtained during the routine executed last time; and $z^{-2}$ is the value of Pt×H (z) or Ptc obtained during the routine executed two times before, that is, the corrected target driving force obtained during the routine executed two times before.

As described above, in the vehicle 1, the first processor 11 of the powertrain control ECU 10 executes the aforementioned processes. When the filter 115 (i.e., the correction means) corrects the target driving force Pt, the damping characteristic of the filter 115 is changed according to the running mode (running characteristic) set by the driver using the mode-switch 18, the information on the environment around the vehicle 1 obtained by the environmental information-obtaining device 17 that includes the navigation system, and information on the running condition of the vehicle 1 such as information on whether the vehicle is turning. Accordingly, in the vehicle 1 that includes the powertrain control ECU 10, the target driving force Pt is appropriately corrected to suppress the vibration on the spring of the vehicle, taking into account the running characteristic set by the driver, the environment around the vehicle 1, and the running condition of the vehicle 1. Therefore, even if the driver changes the running characteristic of the vehicle, or even if the environment around the vehicle 1 or the running condition of the vehicle 1 changes, the vehicle vibration 1 can be effectively suppressed.

What is claimed is:

1. A vehicle control apparatus configured to set a target control amount related to running movement of a vehicle, and controls at least a powertrain device of the vehicle based on the target control amount, comprising:
   a target control amount setting device configured to set the target control amount based on at least one of an instruction from a driver and an instruction from a predetermined control device included in the vehicle;
   a running characteristic determination device configured to determine a running characteristic of the vehicle set by the driver; and
   a correction device configured to correct the target control amount set by the target control amount setting device to suppress vibration on a spring of the vehicle,
   wherein the correction device includes a quadratic notch filter that has a damping characteristic which damps the vibration on the spring of the vehicle,
   wherein a correction amount, by which a target driving force of the vehicle is corrected by the correction device, is adjusted according to the running characteristic determined by the running characteristic determination device,
   wherein the quadratic notch filter adjusts a parameter which determines the damping characteristic according to the running characteristic determined by the running characteristic determination device, and
   wherein the quadratic notch filter suppresses a component that induces the vibration in a transfer function where the target driving force is used as an input and a suspension stroke of the vehicle is used as an output.

2. The vehicle control apparatus according to claim 1, further comprising an environment determination device configured to determine the environment around the vehicle,
   wherein the correction device further adjusts the correction amount according to the environment around the vehicle determined by the environment determination device.

3. The vehicle control apparatus according to claim 1, further comprising a running condition determination device configured to determine the running condition of the vehicle, and the correction device further adjusts the correction amount according to the running condition determined by the running condition determination device.

4. The vehicle control apparatus according to claim 3, wherein the running condition determination device includes a steering angle sensor.

5. The vehicle control apparatus according to claim 1, further comprising an environment determination device configured to determine the environment around the vehicle; and a running condition determination device configured to determine the running condition of the vehicle,
   wherein the correction device further adjusts the correction amount according to the environment around the vehicle and the running condition.

6. The vehicle control apparatus according to claim 1, wherein the target driving force of the vehicle is not corrected if a vehicle stability control is activated in the vehicle.

7. A method of suppressing vibration of a vehicle, which reduces vibration on a spring of a vehicle, comprising:
   setting a target control amount used to control at least a powertrain device of the vehicle based on at least one of an instruction from a driver and an instruction from a predetermined control device included in the vehicle using a target control amount setting device;
   determining a running characteristic of the vehicle set by the driver using a running characteristic determination device;
   setting up a correction equation used to suppress the vibration on the spring of the vehicle based on the running characteristic using a correction device; and
   correcting the target control amount using the correction equation using the correction device,
   wherein the correction device includes a quadratic notch filter that has a damping characteristic which damps the vibration on the spring of the vehicle,
   wherein the damping characteristic is adjusted according to the running characteristic,
   wherein the target control amount is a target driving force of the vehicle and a parameter which determines the damping characteristic is adjusted according to the running characteristic,
   wherein the quadratic notch filter adjusts a parameter which determines the damping characteristic according to the running characteristic determined by the running characteristic determination device, and
   wherein the quadratic notch filter suppresses a component that induces the vibration in a transfer function where the target during force is used as an input and a suspension stroke of the vehicle is used as an output.

* * * * *